July 5, 1966  R. D. SCHLESCH ETAL  3,258,822

PIPE CLAMP

Filed Jan. 28, 1963  2 Sheets-Sheet 1

INVENTORS:
RONALD D. SCHLESCH
ELDON W. MORAIN

BY Head & Johnson
ATTORNEYS

*INVENTOR.*
RONALD D. SCHLESCH
ELDON W. MORAIN

BY *Head & Johnson*

ATTORNEYS

United States Patent Office 3,258,822
Patented July 5, 1966

3,258,822
PIPE CLAMP
Ronald D. Schlesch and Eldon W. Morain, Tulsa, Okla., assignors to Continental Industries, Inc., Tulsa, Okla., a corporation of Oklahoma
Filed Jan. 28, 1963, Ser. No. 254,269
1 Claim. (Cl. 24—284)

This invention relates to a pipe clamp. Still more particularly, the invention relates to a new and novel type of pipe clamp characterized by an inexpensive and effective hinge construction arranged in such a manner that the clamp, when assembled around a pipe, contacts the exterior circumference of the pipe at substantially the full 360° circumference thereof.

Pipe clamps have been manufactured and utilized extensively in industry for many years and their general construction and application is well known. A popular type of pipe clamp is the hinged type permitting the clamp to be assembled directly to a pipe in use. The most frequently used type of hinged pipe clamp is constructed of two halves hinged along one edge. The hinge consists of two hook portions which lock with each other. A problem with this type of clamp in present use is that the provision of hinge forming hook portions usually require that the clamp in the area of the hook portions extend out away from the pipe so that the internal diameter of the assembled clamp is interrupted. In addition, the design of clamps having hook type hinges ordinarily requires the clamps to be manufactured by casting, that is, the clamps are of cast metal. It is an object of the invention to provide a pipe clamp having a novel hinge construction wherein the clamp when assembled around a pipe contacts the pipe at the full circumference thereof.

Another object of this invention is to provide a pipe clamp of extreme simplicity in design and construction and a clamp capable of withstanding increased pressures.

Another object of this invention is to provide a pipe clamp including an integral collar extending therefrom.

Another object of this invention is to provide a pipe clamp including an integral T member extending therefrom.

These and other objects and a better understanding of the invention may be had by referring to the following description and claim taken in conjunction with the attached drawings, in which:

This invention may be described as a pipe clamp. More particularly, but without limitations, the invention may be described as a clamp for a pipe comprising a first substantially semi-tubular body member, a second substantially semi-tubular body member, said second body member having a wedge shaped slot formed therein at one longitudinal edge thereof, said first and second semi-tubular body members having an internal diameter substantially equal to the external diameter of said pipe, a dovetailed hinge member integrally formed with and extending from one of the longitudinal edges of said first body member, said wedge shaped slot of said second body member adaptable to lockably receive said dovetailed hinge member of said first body member, and means of supporting said body members together around said pipe.

Figure 1:
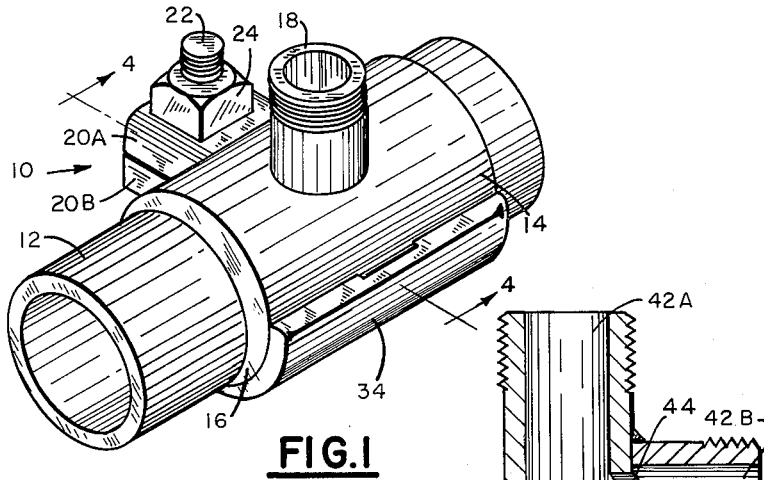
FIGURE 1 is an isometric external view of the pipe clamp of this invention affixed to a pipe, the clamp shown having an integral tubular collar member extending therefrom.

Referring now to FIGURE 1, the pipe clamp of this invention is indicated generally by the numeral 10 and is shown affixed to a pipe 12. The invention will be described as it is applied to a pipe, it being understood that the word pipe includes any cylindrical member to which a clamp would be attached. The clamp consists of an upper or first substantially semi-tubular body member 14 and a lower or second substantially semi-tubular body member 16. The clamp 10 of this invention may be equipped with an integral tubular collar member 18 which may be equipped with either internal or external threads by which a branch outlet may be attached. To hold the clamp 10 around the pipe 12 means such as perpendicularly extending lugs 20 are provided receiving a bolt 22 and nut 24.

Figure 2:
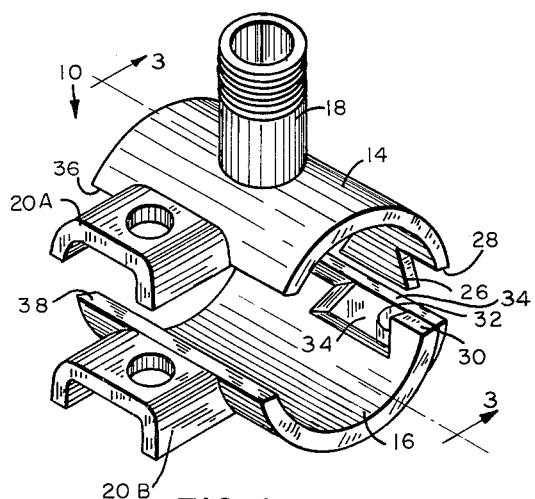
FIGURE 2 is an exploded view of the two halves of the clamp of this invention separated from each other.

The details of the design of the clamp of this invention is better illustrated in FIGURE 2. The first body member 14 is provided with an integrally formed dovetail shaped hinge member 26 which is formed to and extends from the first body member 14 at one of the longitudinal edges 28. Formed in the second body member 16 at one of the longitudinal edges 30 is wedge shaped slot 32. When the clamp 10 is to be assembled about a pipe, the dovetailed hinge member 26 is inserted into the slot 32 in a hinged manner and as the body members 14 and 16 are moved to engage the exterior of the pipe the dovetail shaped hinge member 26 is locked within the slot 32. The portion of the second body member 16 in the area adjacent the longitudinal edge 30 where slot 32 is formed is maintained with the same interior diameter as the balance of the body member and likewise the dovetailed hinge member 26 extending from the first body member 14 is formed in a manner to continue at its inner surface the internal radius of curvature of the body member 14 so that when the dovetailed hinge member 26 is inserted in slot 32 and the body members drawn together about a pipe the total interior circumference of the clamp fits snugly about the pipe.

An alternate embodiment of the hinge includes the provision of a reinforcing member 34 affixed to the exterior of the second body member 16 at the area surrounding the slot 32. Preferably, the reinforcing member 34 is a curved member of approximately the same thickness and length as the second body member 16 which may be welded or otherwise formed with the body member 16. The reinforcing element 34 serves two primary functions. First, it retains the dovetailed hinge member 26 in slot 32 and prevents it from being forced, by pressure or otherwise, away from the exterior of the pipe to which the clamp is attached. Second, the reinforcing member 34 serves to reinforce the metal surrounding and forming the slot 32 to add increased strength to the clamp of this invention.

As a means of maintaining the two body portions 14 and 16 together about a pipe, a lug 20A is attached to the first body portion 14 adjacent the longitudinal edge 36 opposite the longitudinal edge 28 having the dovetailed hinge member appending therefrom, and in like manner a lug 20B is affixed to extend from the second body portion 16 adjacent the longitudinal edge 38 opposite the longitudinal edge 30 containing the slot 32. The lugs 20A and 20B preferably extend substantially perpendicular to the radial axis of the semi-tubular body portion 14 and 16 so as to extend substantially parallel to each other.

Although lugs 20A and 20B may be of a variety of configurations, the embodiment shown is preferred, each lug 20 consisting of an inverted U-shaped configuration. This configuration is easily formed of sheet steel and affords substructural rigidity. The lower lug 20B is adapted to receive the head of bolt 22 (see FIGURE 4). Nut 24 may be easily tightened by means of a wrench on the flat upper surface of upper lug 20A.

Figure 3:
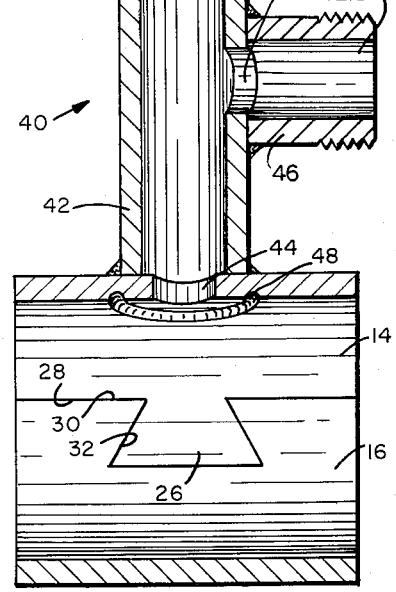
FIGURE 3 is a cross-sectional view taken along the line 3—3 of FIGURE 2 showing the internal appearance of the clamp of this invention at the hinge portion as the clamp is assembled around a pipe but showing in cross-section an integrally T member affixed to the clamp.

Referring to FIGURE 3, the means whereby the assembled body portions 14 and 16 are hinged by the interlocking of the dovetailed hinge member 26 with the wedge shaped slot 32 is shown.

FIGURE 3 shows an alternate embodiment of the clamp of this invention including an integral T member, generally indicated by the numeral 40, extending from body portion 14. The T member 40 may be of the self-punching type including an internal self-contained punch member (not shown), or may be of the type shown including the provision of two outlets 42A and 42B. An opening 44 is provided in body portion 14, by which communication is provided with the interior of the clamp. The T 40 includes a tubular portion 46 which is affixed to and extends from the first body member 14 at the opening 44.

The provision of a collar 18 or a T 40 is exemplary of types of communicating members which may be integrally affixed for ready utilization of the clamp of this invention. Any other type of coupling device would be within the purview of the invention.

FIGURE 3 shows, formed in the interior surface of first body portion 14 in the area surrounding opening 44, a gasket groove 48 which is adapted to receive a gasket, such as an O-ring (not shown), to insure a leak-proof seal when the clamp is affixed to a pipe having an opening therein.

Figure 4:
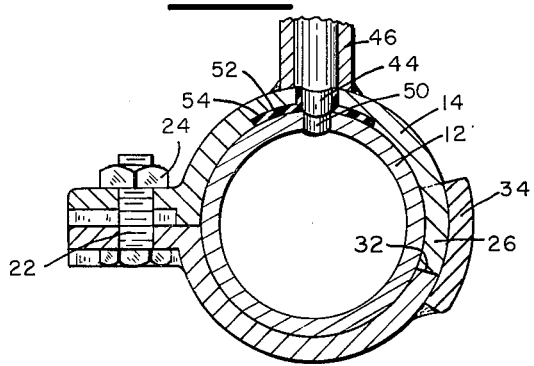
FIGURE 4 is a cross-sectional view taken along the line 4—4 of FIGURE 1 showing the clamp of this invention affixed to a pipe.

FIGURE 4 is a cross-sectional view showing the clamp of this invention affixed to pipe 12. The pipe 12 is provided with an opening 50, which may be formed in the pipe either before or after the clamp of this invention is attached, which opening 50 mates with opening 44 in upper body portion 14. A flat or washer type gasket 52 may be utilized as a means of sealing the pipe 12 around opening 50. A gasket recess 54 may be provided in the interior of the first body portion 14 around opening 44 to receive the gasket 52. FIGURE 4 clearly shows the provision of the reinforcing member 34 which may cover various portions of the external area of second body portion 16 to retain the dovetailed hinge member 26 properly within the slot 32 and to form a reinforcement of the area surrounding the slot 32.

Figure 5:
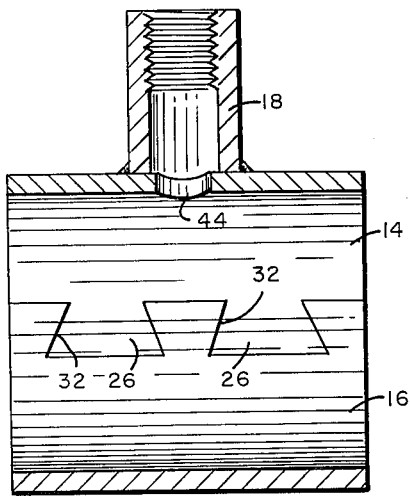
FIGURE 5 is a cross-sectional view of an assembled clamp showing the hinge portion of the clamp and showing an alternate arrangement of the hinge portion.

The embodiment shown in FIGURES 2 and 3 shows the utilization of a single slot 32 receiving a single dovetailed hinge member 26. FIGURE 5 is a cross-sectional view showing an alternate arrangement demonstrating that multiple slots 32 may be provided to receive multiple dovetailed hinge members 26.

Figure 6:
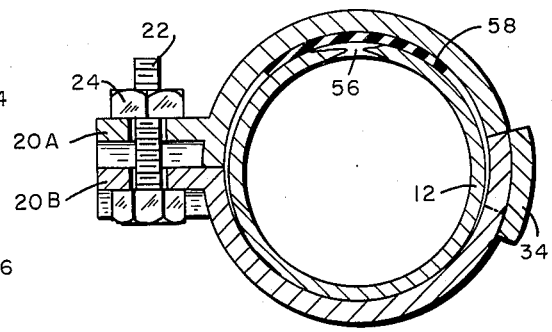
FIGURE 6 is a cross-sectional view of a clamp of this invention showing the clamp as utilized to seal a hole in a pipe.

FIGURE 6 is a cross-sectional view showing the use of the clamp of this invention as a means of sealing a hole 56 in the pipe 12. When the clamp is used in this manner as a repair clamp no opening nor any type of collar member 18, or T member 40 or similar attachment element is required. A repair gasket 58 is placed over the hole 56 and the clamp applied. The means may be provided to receive a portion of the thickness of gasket 58, or the clamp may be constructed as shown without such recess means.

Figure 7:
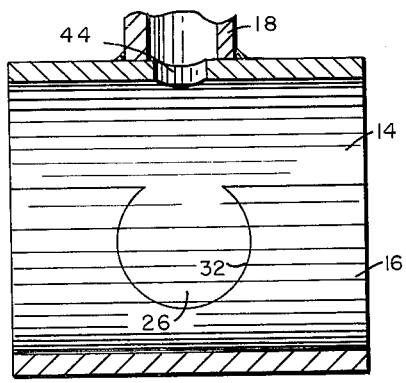
FIGURE 7 is a cross-sectional view of a clamp of this invention taken at the hinge area showing an alternate hinge construction arrangement.
Figure 8:
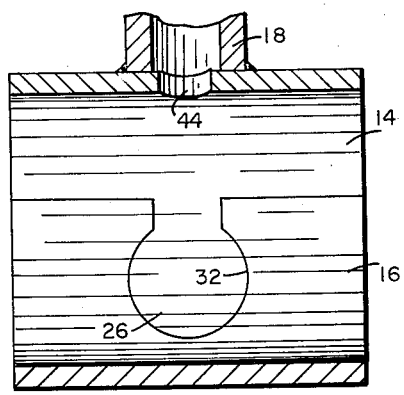
FIGURE 8 is a cross-sectional view of a clamp of this invention showing the hinge area and showing an additional alternate hinge construction arragement.
Figure 9:
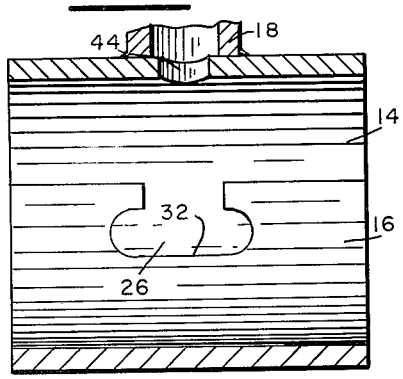
FIGURE 9 is a cross-sectional view of the clamp of this invention showing a still different hinge construction arrangement.

The novel hinge arrangement of this invention requires the interlocking of a portion of first body member 14 with a slot in second body member 16. The configuration of the dovetailed hinge member 26 or the slot 32 is subject to a great many geometrical variations. FIGURES 7, 8 and 9 disclose various alternate arrangements of the mating dovetailed portions 26 with the slots 32, all of which, along with other geometrical configurations, are within the purview of this invention. The expression "dovetailed hinge member" means any portion extending from one body member adaptable to slide into a slot formed in the second body member and to be retained in the slot from extraction by force tangential to the semi-tubular body members in the area of the slot. The slot 32 may be of any configuration to receive a mating dovetailed hinge member and retain the dovetailed hinge member against force applied tangential to the slot.

The body portions 14 and 16 are described as being "substantially semi-tubular." By this is meant that the portions are preferably formed substantially in the shape of a tubular element cut approximately in a plane of the tubular axis, the cut forming the longitudinal edges 28, 30, 36 and 38. The body portions 14 and 16 may be less than fully semi-tubular so that the longitudinal edges 36 and 38 do not completely touch as the clamp is assembled and secured about a pipe, but the preferred embodiment includes the arrangement wherein the longitudinal edges 28 and 30, and 36 and 38, are in close proximity when the clamp is firmly secured to a pipe.

It can be seen that an alternate arrangement of the embodiment of FIGURE 5 would include forming one slot 32 and one dovetailed hinge member 26 in first body portion 14 and a matching slot 32 and a dovetailed hinge member in second body portion 16. In addition, in the embodiments shown in FIGURES 2, 5, 7, 8 and 9, the slot 32 may be formed in upper body portion 14 and the dovetailed hinge member 26 extended from lower body portion 16, however such arrangement is not preferred since it places the slot 32 closer to the opening 44. The design of the pipe clamp of this invention is subject to a great amount of geometrical variation without departing from the invention concept.

This invention has been described with a certain degree of particularity but it is manifested that many changes may be made in the details of construction and the arrangement of components without departing from the spirit and scope of this disclosure.

What is claimed:

A clamp for a pipe comprising a first rigid substantially semi-tubular body member; a second rigid substantially semi-tubular body member, said second body member having a wedge shaped slot formed therein at one longitudinal edge thereof, said first and second semi-tubular body members having an internal diameter at least equal to the external diameter of said pipe; a dovetailed hinge member integrally formed with and extending from one of the longitudinal edges of said first body member, said wedge shaped slot of said second body member adaptable to hingeably and lockably receive said dovetailed hinge member of said first body member; a means of supporting said body members together around said pipe; and a rigid metallic reinforcing member affixed only to the exterior of said second body member over said wedge shaped slot.

References Cited by the Examiner

UNITED STATES PATENTS

| | | | |
|---|---|---|---|
| 508,914 | 11/1893 | Cain | 248—62 |
| 675,243 | 5/1901 | Proctor | 285—197 X |
| 1,515,355 | 11/1924 | Mitchell | 285—330 |
| 1,831,641 | 11/1931 | Skinner | 285—373 X |
| 2,739,018 | 3/1956 | Collett | 285—419 X |

FOREIGN PATENTS

| | | |
|---|---|---|
| 1,205,866 | 8/1959 | France. |
| 1,090,903 | 10/1960 | Germany. |
| 413,045 | 3/1946 | Italy. |

CARL W. TOMLIN, *Primary Examiner.*

C. FAGAN, T. F. CALLAGHAN, *Assistant Examiner.*